United States Patent Office 3,377,369
Patented Apr. 9, 1968

3,377,369
REPETITIVE PROCESS FOR THE REMOVAL AND/OR RECOVERY OF ORGANIC ACIDIC COMPOUNDS FROM SOLUTION
Roger N. Sargent and Robert M. Wheaton, Midland, Mich., assignors to The Dow Chemical Company, Midland, Mich., a corporation of Delaware
Continuation-in-part of application Ser. No. 69,893, Nov. 17, 1960. This application Jan. 28, 1966, Ser. No. 532,038
12 Claims. (Cl. 260—412.5)

ABSTRACT OF THE DISCLOSURE

An acidic phenolic or carboxylic compound which is molecularly sorbed on a low capacity acid- or salt-form sulfonated poly (vinylaryl) cation exchange resin is removed by neutralizing both the sorbed acidic compound and acid form resin, if used, with aqueous strong base and diluting with water the acidic compound as in an ionic salt of said base.

---

Figure 1:
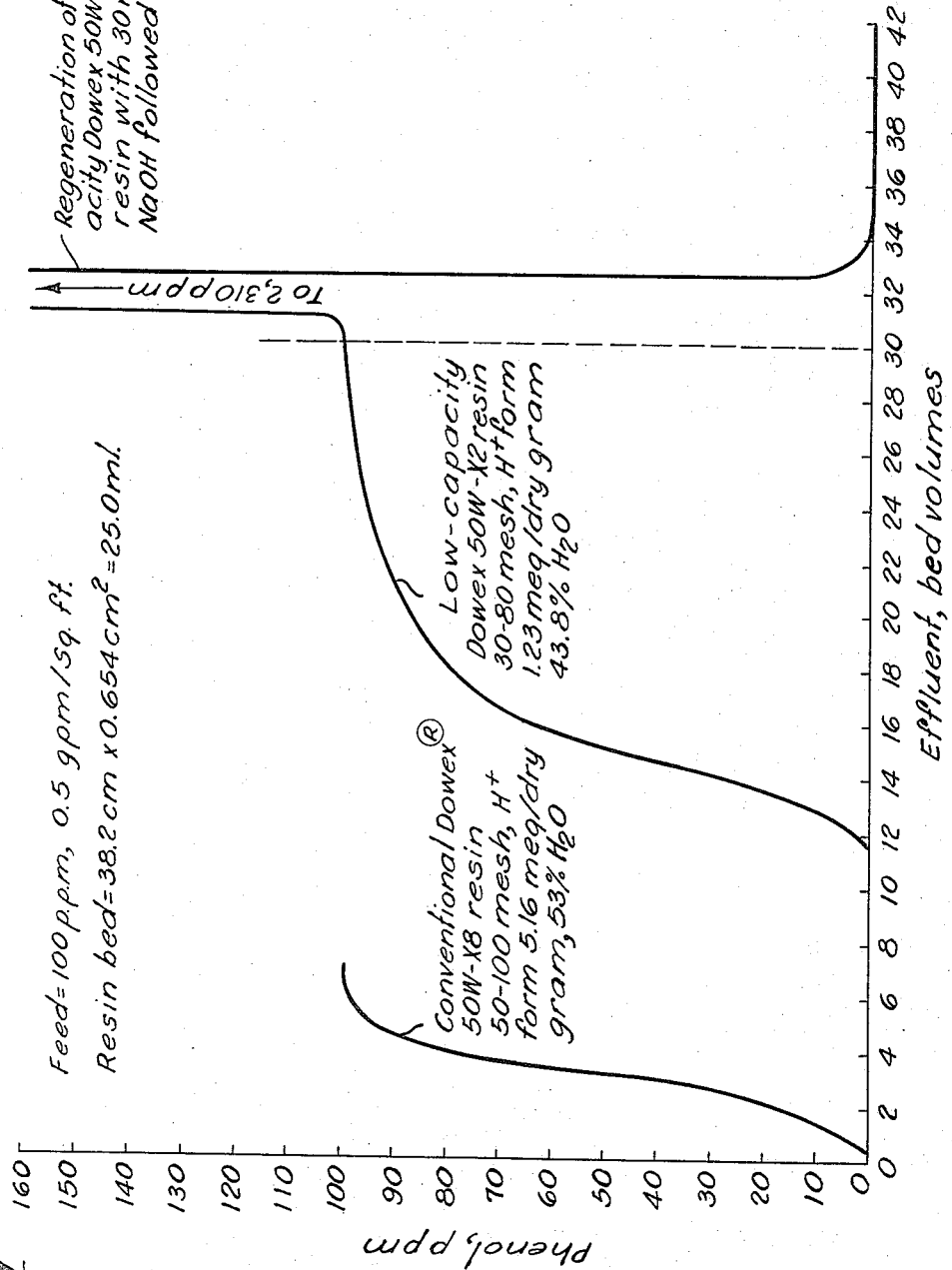

This application is a continuation-in-part of our copending U.S. Patent Application Ser. No. 69,893, filed Nov. 17, 1960, now abandoned.

This invention concerns a repetitive process for recovering organic acidic compounds by molecular sorption on and desorption from a low-capacity cation-exchange resin.

The removal of an organic acidic compound, e.g., phenol, from an aqueous solution has been accomplished by molecular sorption on a variety of excellent sorbents, e.g., charcoal. After its sorption capacity has been reached, the loaded sorbent is generally discarded because of the difficulty of reactivation. Removal of organic acidic compounds from solution by sorption is, therefore, relatively easy. However, to make such a removal process economical, the sorbent should be easily regenerated and the sorbed material should be recoverable.

Ion exchange resins have been used in the past as sorbents for phenol. Several regeneration methods have been proposed. One method for the sorption of phenol from aqueous solution on a bed of conventional quaternary ammonium anion exchange resin in a salt form has been described [U.S. Patent 2,861,948 (1959) and Ind. Eng. Chem., 47:71 (1955)] in which the sorbed phenol is eluted, and the resin regenerated, with a water-miscible organic liquid, e.g., methanol. Regeneration is slow and requires a large volume of methanol, necessitating a methanol recovery process for economical operation. The use of an aqueous solution of water-soluble hypochlorite instead of methanol for regeneration of the resin has been proposed (U.S. Patent 2,911,363). This process, based upon the destruction of the sorbed phenol by oxidation, uses large excesses of hypochlorite, e.g., 20 gal. of 7% sodium hypochlorite solution per cubic foot of resin which had sorbed 190 g. of phenol. Furthermore, it has been shown that aqueous solutions of hypochlorite have a deleterious effect upon anion exchange resins.

It has previously been found [Dechema-Monographien 26, 219 (1956); J. Phys. Chem. 63:1511 (1959); U.S. Patent 3,179,703, issued Apr. 20, 1965] that the sorption of certain water-soluble organic compounds on ion exchange resins increases through a maximum as the ion-exchange capacity of the exchanger is decreased. The usefulness of a low-capacity ion-exchange resin, however, would be greatly enhanced if an economical method were available for the removal and, advantageously, the recovery of the sorbed species so that the resin could be used in a repetitive manner.

This invention concerns a method for removing organic acidic compounds, i.e., phenols, monocarboxylic acids, dicarboxylic acids and aminocarboxylic acids from solution by molecular sorption on sulfonated poly(vinylaryl) cation exchange resins of low capacity and recovering these acidic compounds as their ionic water-soluble salts in high concentration by treating the resin with an aqueous solution of a strong base in a quantity sufficient to convert the sorbed organic acidic compound to its ionic water-soluble salt. The salt of the organic acidic compound is not appreciably sorbed by such resin and can be rinsed from the resin's interstitial solution with a small volume of water.

The low-capacity sulfonated cation exchange resins used in the process of this invention are in bead form and have from 10 to 60% of the theoretical amount of monosulfonation as conventional sulfonated ion-exchange resins, advantageously uniformly distributed on a cross-linked resinous poly(vinylaryl) matrix, such anionic resin moiety hereinafter being sometimes indicated as $\overline{R}$. Such resins sorb organic acidic compounds from their solutions more tenaciously than the conventional sulfonated cation exchangers and nearly as well as the conventional quaternary ammonium anion exchangers previously used. As described above, the regeneration of the resin is much more effective and economical than that attainable with other sorbents, and is without detrimental effect on the sorbent.

Neither the conventional nor the low-capacity quaternary ammonium anion exchange resins that have been used in the prior art can be used in the process of this invention because their regeneration would be incomplete due to the exchange reaction of the anion of the organic acidic compound (A⁻) with the cationic moiety of the resin ($\overline{R}^+$), as shown by the following equation:

HA (sorbed on resin) + OH⁻ ⟶

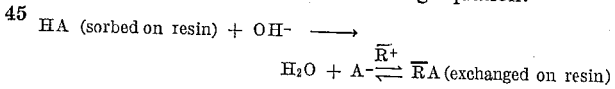

The low-capacity sulfonated cation exchange resins used in the process of this invention are advantageously made by swelling a resinous vinylaryl polymer, e.g., that of vinylbenzene, vinyltoluenes, vinylxylenes, vinylnaphthalenes, vinylethylbenzenes, α-methylstyrene, vinyl chlorobenzenes, etc., and mixtures thereof, crosslinked with between 0.1 and 10 mole percent, preferably 1 to 4 mole percent, of a dialkenyl crosslinking agent, e.g., divinylbenzenes, divinyltoluenes, divinylnaphthalenes, divinylxylenes, divinylethylbenzenes, diallyl esters, diacrylate esters, etc., with a swelling agent which is also an inert solvent for chlorosulfonic acid, cooling to about −60° C., admixing chlorosulfonic acid in an amount sufficient to monosulfonate from 10 to 60% of the available aryl nuclei, and gradually heating the mixture to a sulfonation temperature of about −20° to 20° C. so that sulfonation occurs slowly and uniformly throughout the resin polymer bead. The resins utilized in this invention have a capacity ranging between about 0.8 and 2 milliequivalent per gram, hereafter meq./g., dry weight basis, and a water content of between about 20 and 60 weight percent. A conventional sulfonated cation exchange resin has a dry weight capacity of about 5.2 meq./g.

Phenols which can be sorbed from their aqueous and nonaqueous hydrophilic liquid organic solvent solutions by the salt or acid form of the low-capacity resins described above and readily eluted from the resin by treatment with an aqueous solution of a strong base as hereinafter described, followed by water, are the acidic phenols and their nuclearly substituted derivatives containing one or more alkyl, aryl, aralkyl, cycloalkyl, alkoxy, halo, amine, hydroxy or nitro groups. Examples of phenols that can be sorbed from their aqueous solutions by the method described herein are phenol, o-, m-, and p-cresol, xylenol, mono-, di-, tri-, tetra- and pentahalophenols, o-phenylphenol, p-tertiary-butylphenol, guaiacol, ethylphenol, nitrophenol, carvacrol and hydroxyaniline. Such phenols can be sorbed from their aqueous solutions containing as little as one part per million, hereafter p.p.m., of the phenolic compound.

Carboxylic acids which can be sorbed from their aqueous and nonaqueous hydrophilic liquid organic solvent solutions by the salt or preferably the acid form of the low-capacity sulfonated resins described above and readily eluted from the resin by a solution of strong base, followed by water, are the monocarboxylic and, to a relatively lesser extent, the dicarboxylic acids of the aliphatic and aromatic series, e.g., propionic, butric, valeric, caprylic, benzoic, malonic, succinic and adipic acids and their alkyl, aralkyl, amino and halo substitution products.

Aminocarboxylic acids, commonly called amino acids, which can be sorbed on and eluted from the acid or salt form of the resin as described above are the neutral and basic amino acids of which phenylalanine and histidine are examples, and the acidic amino acids, e.g., glutamic acid. The latter are preferentially sorbed on and eluted from the acid form of the resin for reasons discussed below.

The organic acidic compound is always sorbed in the molecular or nonionic form. The extent to which the acidic compound is ionized in solution will lower the quantity sorbed on the salt form of the resin, but it should be remembered that the hydrogen form of the resin will allow more sorption of a stronger acid due to the common (hydrogen) ion effect which suppresses ionization within the bead. Those organic acidic compounds whose ionization constants are about $10^{-4}$ or higher can undergo a considerable amount of exchange with the salt, e.g., sodium form of the resin, Na Resin, as shown by the following equation:

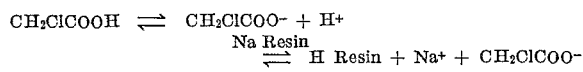

It is therefore desirable that the hydrogen form of the resin be used for such acids. The sodium or other salt form of the resin may be used advantageously when the ionization constant of the acidic compound is about $10^{-9}$ or lower, e.g., phenol, neutral and basic amino acids. Acids of intermediate strength can be sorbed rather effectively, especially at higher concentrations, by the sodium form resin. When any amino acid (A) is sorbed on the hydrogen form of the resin, H Resin, additional sorption occurs by virtue of protonation with the resin, as follows:

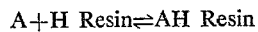

To desorb an organic acidic compound from the salt form of a low-capacity sulfonated resin, the loaded resin is reacted with a small excess of any of the well-known aqueous strong bases, e.g., that of an alkali metal, alkaline earth metal or quaternary ammonium hydroxide, up to ca. 10% in excess of the equivalent quantity of acidic compound sorbed, with which the acidic compound forms an ionic water-soluble salt, followed by water elution of the organic acidic compound as its ionic water-soluble salt. Advantageously aqueous 1 to 10 weight percent strong base is used. Among the well-known aqueous strong bases which form ionic water-soluble salts with the organic acidic compounds are potassium and sodium hydroxide, calcium and strontium hydroxide, and tetramethyl, benzyltrimethyl, ethyltrimethyl, and butyltrimethyl ammonium hydroxides, the quaternary ammonium bases mentioned being representative of the well-known strongly basic quaternary ammonium hydroxides which are water-soluble and form ionic water-soluble salts like their alkali metal and alkaline earth metal hydroxide counterparts. The resin bed is thereby regenerated and is ready for another sorption cycle. However, when the acid form of the resin is necessarily or advantageously employed for the sorption step, as described hereinafter, it is necessary to use additional strong base in an amount equivalent to the exchange capacity of the resin to convert the resin to the salt form before efficient elution of the organic acidic compound as its ionic water-soluble salt is possible. The resin must then be converted back to the hydrogen form with a solution of a strong mineral acid before the next sorption cycle with the acid form of resin is begun.

The presence of an ionic solute in the solution of an organic acidic compound is not detrimental to the sorption process. It is, in fact, sometimes very beneficial in increasing the distribution ratio of the organic acidic compound due to a salting-out effect. An example of the beneficial effect on the sorption by the presence of an ionic solute is given below.

As a general rule, the more hydrophobic organic acidic compounds, e.g., caprylic acid, sorb more tenaciously than the hydrophilic organic acidic compounds, e.g., propionic acid, as shown by their distribution constants ($K_d$) of 357 and 3.5, respectively. Low-capacity sulfonated cation exchange resins, because of a lesser number of ionic functional groups, although still water-wettable, will swell to a greater extent in hydrophilic liquid organic solvents, such as methanol than will conventional high capacity ion exchange resins. As shown in an example below, there is still a sufficient difference in the relative hydrophilicity or hydrophobicity of caprylic acid and methanol that caprylic acid may be sorbed very effectively from a non-aqueous methanol solvent, the distribution constant being 254.

In practice, the solvent-wet low-capacity sulfonated cation exchange resin in the acid or salt form is contacted with the solution of the organic acidic compound to be sorbed. Advantageously, the solution of the organic acidic compound is fed to a bed of solvent-wet resin (the solvent being water or a water-miscible organic liquid) at a rate such that the organic acidic compound is substantially completely sorbed by the resin and is removed from solution. A simple test on the effluent provides such rate information. The effluent liquor which is substantially free of the organic acidic material is drained from the resin. Preferably at or just before the breakthrough of the organic acidic compound, the resin is washed with an aqueous or alcoholic solution of a strong base, e.g., an alkali metal, alkaline earth metal or quaternary ammonium hydroxide, in an amount in small excess, up to about 10%, over the stoichiometric amount of organic acidic compound sorbed, plus sufficient strong base to neutralize the resin, if sorption is carried out using the resin in the hydrogen form, to convert the organic acidic compound to its ionic water-soluble salt form which is not appreciably sorbed by the resin. Advantageously, a 1 to 10 weight percent solution of the base, e.g., sodium hydroxide, is used. Usually about one bed volume or less of water is all that is needed to rinse the salt of the organic acidic compound from the resin's interstitial solution. Two or more resin beds may be operated in parallel so that while one bed is being regenerated, another bed is being used to sorb the organic acidic compound from its solution. The flow of feed and regenerant solutions may be either upward or downward through the bed. The organic acidic compound, being recovered in the regeneration effluent as its ionic water-soluble salt at a considerably higher concentration than in the feed, can be recovered from solution, if desired, by usual techniques such as acidification, followed by distillation, crystallization or extraction.

Alternatively, the solution of the organic acidic compound may be contacted batchwise with a low-capacity sulfonated ion exchange resin until equilibrium is reached or is substantially reached. The resin is then separated from the residual liquor by filtration and treated with aqueous base and water rinses to desorb and remove the organic acidic compound as its salt.

The following examples describe the preferred embodiments and the best mode contemplated by the inventors for carrying out the invention. The examples below are in illustration and not in limitation of the invention, which is defined in the claims.

EXAMPLE 1

An aqueous solution of 100 p.p.m. of phenol was passed downflow at 0.5 gallon per minute per square foot, hereafter g.p.m./ft.$^2$, through a 38.2 cm. x 0.654 cm.$^2$ (25 ml.) cylindrical bed of a low-capacity sulfonated poly(vinylaryl) cation exchange resin (dry weight capacity=1.23 meq./g.) in the sodium form, prepared as described above. After passage of 16.8 bed volumes of this solution, phenol was detected (6.3 p.p.m.) in the column effluent. The feed was discontinued at 540 ml. (21.6 bed volumes) when the phenol concentration had risen to a value of 69.2 p.p.m., and the bed was regenerated by elution with 2.0 ml. of one-normal aqueous sodium hydroxide followed by a water rinse. The phenol was completely eluted from the bed as sodium phenate in the following two bed volumes of eluate at an average concentration of 3,600 p.p.m.

EXAMPLE 2

The procedure of Example 1 was repeated with an aqueous feed containing 4,000 p.p.m. phenol under analogous conditions. Phenol was detected in the effluent after the passage of 154 ml. (6.15 bed volumes). After the passage of 189 ml. of feed, the bed was regenerated with 15.0 ml. of one-normal aqueous sodium hydroxide followed by a water rinse. Phenol in the regeneration effluent averaged 56,000 p.p.m. or 14 times that in the feed. When the regeneration effluent was acidified with sulfuric acid, a second phase of water-saturated phenol was formed which was recoverable by decantation or by extraction with a suitable solvent such as chloroform.

EXAMPLE 3

Four and one-half bed volumes of a plant stream consisting chiefly of 0.070 molar phenol in concentrated hydrochloric acid was passed downflow at 0.5 g.p.m./ft.$^2$ through a 68.0 cm. x 1.47 cm.$^2$ bed of sulfonated polystyrene cation exchange resin, hydrogen form, whose dry weight capacity was 1.23 meq./g. Hydrochloric acid was detected in the effluent after 0.4 bed volumes of effluent had passed. Its concentration was substantially that of the feed at 0.75 bed volumes of effluent. From 0.75 to 5.25 effluent bed volumes there was collected a phenol-free cut of concentrated hydrochloric acid. After the passage of 450 ml. of feed, successive passage of a 25 ml. water rinse, 40 ml. 10% aqueous sodium hydroxide eluant and a 115 ml. water rinse, the sorbed phenol was completely removed as sodium phenate. Following conversion of the resin back to the hydrogen form with dilute hydrochloric acid, the cycle may be repeated.

EXAMPLE 4

A waste stream which presented disposal difficulties because it contained a small quantity of pentachlorophenol was passed through a 10 ml. bed of the resin used in the preceding example. Following Table I gives breakthrough results obtained with the indicated effluent fractions.

TABLE I.—PENTACHLOROPHENOL BREAKTHROUGH

| Effluent, ml.: | Pentachlorophenol, p.p.m. |
|---|---|
| 0–1000 | 0 |
| 1000–1738 | 0.33 |
| 1738–1860 | 4.29 |
| 1860–2250 | 13.8 |
| 2250–2920 | 49.3 |

The pentachlorophenol was removed from the resin by elution with aqueous sodium hydroxide, as in the preceding examples.

EXAMPLE 5

In FIGURE 1, column experiments are shown which compare results obtained with standard sulfonated cation exchange resin (sulfonated polystyrene crosslinked with 8% divinylbenzene, 5.16 meq./dry gram) and with a low-capacity sulfonated cation exchange resin (sulfonated polystyrene crosslinked with 2% divinylbenzene, 1.23 meq./dry gram) for a feed whose concentration was 100 p.p.m. phenol. Resins were chosen which had comparable water contents. As the graphs show, phenol content of the effluent from the conventional resin bed began to rise with less than one bed volume of effluent, whereas almost 12 bed volumes of effluent were collected from the low-capacity resin bed before phenol began to come through. An example of the ease with which phenol can be stripped from a low-capacity sulfonated cation exchanger is also shown in FIGURE 1. A quantity of aqueous sodium hydroxide sufficient to convert the molecularly sorbed phenol to sodium phenate and the hydrogen form of the resin to the sodium form, followed by a small water rinse was all that was needed for quantitative elution of the phenol.

The sodium form of the low-capacity resin was found to sorb phenol to a greater extent that the hydrogen form. Listed below in Table II are the distribution ratios (calculated from the midpoints of the breakthrough curves) as a function of the feed concentration. All runs were made with a 38.2 cm. x 0.654 cm.$^2$ (25 ml.) bed of the low-capacity resin at feed and elution rates of 0.5 g.p.m./ft.$^2$.

TABLE II.—DISTRIBUTION RATIO AS FUNCTION OF CONCENTRATION AND IONIC FORM OF RESIN

| Feed Concentration, p.p.m. Phenol | Ionic Form of Resin | Distribution Ratio [1] |
|---|---|---|
| 100 | H | 39.1 |
| 1,200 | H | 20.6 |
| 8,590 | H | 11.1 |
| 100 | Na | 52.7 |
| 4,000 | Na | 17.8 |

[1] See Anal. Chem. 26:505 (1954).

EXAMPLE 6

Aqueous 100 ml. quantities of 0.05% solutions of the organic acidic compounds listed in Table III below were shaken for 20 hours with 5–8 g. of wet centrifuged low-capacity sulfonated polystyrene resin crosslinked with 2% divinylbenzene and having a dry weight capacity of 1.5 meq./g. and a water content of 47.7% in the hydrogen (acid) form. Results follow:

TABLE III.—SORPTION OF ORGANIC ACIDIC COMPOUNDS

| Acidic Compound | pK$_1$ | pK$_2$ | Solubility [1] | Wet Resin, g. | Sorption [2] | K$_d$ [3] |
|---|---|---|---|---|---|---|
| Propionic | 4.87 | | ∞ | 7.7294 | 0.0180 | 3.5 |
| Valeric | 4.81 | | 3.3 | 5.6887 | .0530 | 18 |
| Caprylic | 4.90 | | 0.7 | 5.1840 | .114 | 257 |
| Malonic | 2.85 | 6.10 | 138 | 6.3520 | .00361 | 0.89 |
| Succinic | 4.19 | 5.57 | 6.8 | 6.6207 | .00432 | 1.16 |
| Adipic | 4.43 | ? | 1.4 | 7.2020 | .00610 | 2.34 |
| Benzoic | 3.98 | | 0.21 | 5.6229 | .0690 | 37.8 |
| Phenol | 9.89 | | 8.2 | 5.1760 | .0738 | 24.5 |
| Phenylalanine | 9.13 | | 1.4 | 5.3388 | .102 | 863 |
| Propionic in Sat'd (NH$_4$)$_2$SO$_4$ | ? | | ? | 6.1644 | .118 | 137 |

[1] Approximate solubility in g./100 g. water.
[2] In mmol. per g. dry resin.
[3] Molarity of solute in the water inside the resin bead + molarity of solute in the external solution at equilibrium.
[4] Part of the unusually large value of K$_d$ for phenylalanine is due to protonation with the hydrogen form resin, as shown in the following equation:

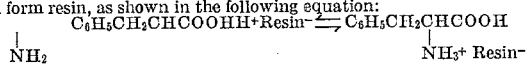

$$C_6H_5CH_2\underset{NH_2}{CHCOOH} + Resin^- \rightleftharpoons C_6H_5CH_2\underset{NH_3^+}{CHCOOH}\ Resin^-$$

Figure 2:
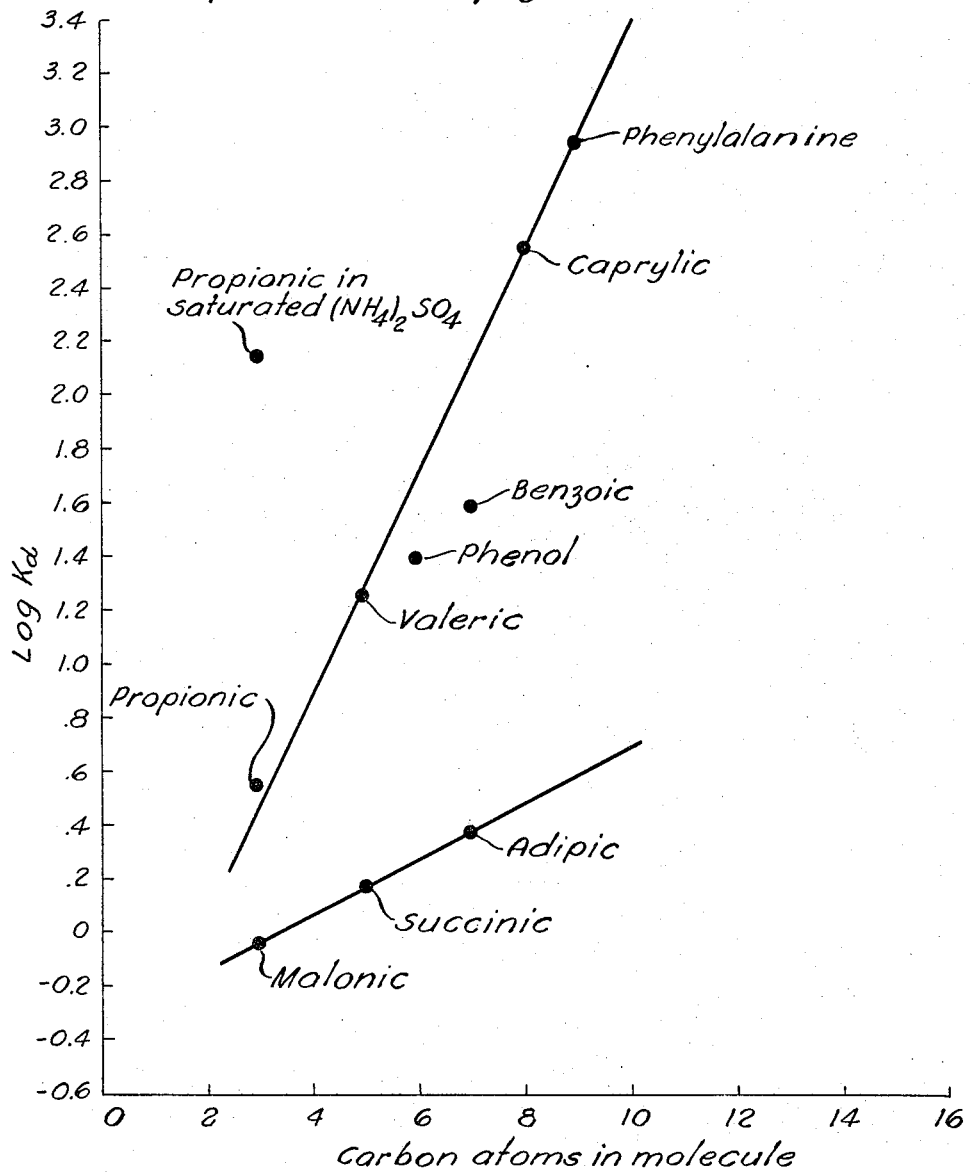

Accompanying FIGURE 2 shows a logarithmic increase in the sorption of organic acidic compound with the number of carbon atoms in the molecule. This plot of the data in Table III can be used to approximate the extent of sorption of other organic acids.

EXAMPLE 7

Through a 44.0 cm. x 0.227 cm.$^2$ (10 ml.) bed of the same resin as used in Example 3 was successively passed 30 ml. of 0.00480 M valeric acid, 8 ml. of 1.00 M sodium hydroxide and 50 ml. of water, all at 0.5 g.p.m./ft.$^2$. Column effluent fraction were collected and analyzed by titration. The results are given in following Table IV.

TABLE IV.—SORPTION OF VALERIC ACID AND REGENERATION OF RESIN BED

| Effluent volume, ml.: | Effluent concentration/ Feed concentration |
|---|---|
| 0–8.7 | 0.000 |
| 8.7–18.5 | .000 |
| 18.5–27.2 | .000 |
| 27.2–34.7 | .0835 |
| 34.7–40.6 | .396 |
| 40.6–45.3 | 5.50 |
| 45.3–49.1 | .271 |
| 49.1–52.1 | .0208 |
| 52.1–55.7 | .000 |

EXAMPLE 8

The sodium form of the resin used in Example 6 was used in two runs. In Run No. 1, aqueous 0.00298 M phenylalanine was passed at a flow rate of 0.5 g.p.m./ft.$^2$ through a 44.0 cm. x 0.227 cm.$^2$ (10 ml.) bed. In Run No. 2, the 0.00298 M solution was saturated with sodium sulfate prior to passing it through a similar bed, which had previously been rinsed with a saturated solution of sodium sulfate. Following Table V shows that the midpoint of the breakthrough curve was shifted from 52 ml. to 270 ml. by the addition of the salt.

TABLE V.—PHENYLALANINE BREAKTHROUGH CURVES

| Run No. 1 | | Run No. 2 | |
|---|---|---|---|
| Effluent Volume, ml. | Effluent Concentration Feed Concentration | Effluent Volume, ml. | Effluent Concentration Feed Concentration |
| 0–14 | 0.000 | 168–182 | 0.101 |
| 14–28 | .132 | 210–224 | .274 |
| 28–42 | .356 | 252–266 | .481 |
| 42–56 | .574 | 294–308 | .661 |
| 56–70 | .707 | 350–364 | .862 |
| 84–98 | .817 | 406–420 | .975 |
| 126–140 | .925 | 518–532 | .981 |
| 266–280 | .965 | | |
| 406–420 | 1.00 | | |

EXAMPLE 9

A series of low-capacity sulfonated cation exchangers was prepared by the sulfonation of resinous polymeric styrene-divinylbenzene copolymers containing 2% divinylbenzene, as described above. The physical and sorption properties of these low-capacity resins are given in following Table VI, together with comparative data for a conventional 2% crosslinked sulfonated resin, designated N, and for the styrene-divinylbenzene resin from which the sulfonated resins were prepared.

TABLE VI.—PROPERTIES OF LOW-CAPACITY RESINS AND RELATED SORBENTS

| No. | Capacity of H$\overline{R}$, meq./dry g. | Water Content | | K$_d$ |
|---|---|---|---|---|
| | | H$\overline{R}$ [1] | Na$\overline{R}$ [2] | |
| N | 5.29 | 88.0 | 73.1 | 1.02 |
| F | 2.73 | 68.0 | 60.5 | 24.2 |
| B | 2.17 | 62.0 | 57.9 | 29.6 |
| D | 1.58 | 48.2 | 46.8 | 65.0 |
| E | 1.06 | 40.9 | 38.5 | 56.7 |
| M | 0.00 | 0.00 | 0.00 | 0.00 |

[1] H$\overline{R}$ = acid form of resin.
[2] Na$\overline{R}$ = sodium form of resin.

In the sorption determinations, about 8 g. of wet centrifuged sodium-form resin of known water content was shaken with 100 ml. of a solution containing 100 p.p.m. of phenol. At intervals of 10, 30, and 100 minutes, a small quantity of the solution phase was withdrawn and analyzed for phenol. Results of the sorption at 100 minutes, essentially equilibrium sorption, are given in Table VI.

Table VI shows that the low-capacity resins (Nos. F, B, D and E) sorbed more phenol than either the standard resin (No. N) or the styrene-divinylbenzene copolymer (No. M) from which resin Nos. F, B, D and E were prepared by sulfonation.

EXAMPLE 10

Two batch equilibrations were made with the hydrogen form resin used in Example 6, wherein caprylic acid was sorbed from methanol and from aqueous methanol. In the first, a weighed quantity (ca. 8 g.) of anhydrous, methanol-wet centrifuged resin was shaken with 50 ml. of a 500 p.p.m. solution of caprylic acid in 100% methanol for 20 hours. From the determination of the percent volatiles in the centrifuged methanol-wet resin and the density of methanol and the determination of the concentration of caprylic acid in the solution phase after equilibration, the distribution constant, K$_d$, was calculated to be 254. The second run was similar except that the resin was centrifuged from aqueous 10% methanol and the caprylic acid was dissolved in aqueous 10% methanol. The distribution constant then was found to be 164.

The substitution of any other aqueous strong base, as earlier taught, to convert the molecularly sorbed organic acidic compound to an ionic water-soluble salt thereof, also destroys the molecular forces of attraction between the molecularly sorbed acidic compound and the low capacity sulfonated cation exchange resin, so that the ionic water-soluble salt which results can be eluted from the resin with a relatively small volume of water.

What is claimed is:

1. A method for removing an acidic compound of the group consisting of (1) phenol and its substitution products which have at least one substituent of the group consisting of alkyl, aryl, aralkyl, cycloalkyl, alkoxy, halo, amine, hydroxy and nitro groups; and (2) carboxylic acids of the group consisting of aliphatic and aromatic monocarboxylic and dicarboxylic acids and their alkyl, aralkyl, amino and halo substitution products; molecularly sorbed on a low-capacity sulfonated poly(vinylaryl) cation exchange resin, said resin being in the acid or salt form of a strong base which base forms an ionic water-soluble salt with said acidic compound; and having from 10 to 60 percent of its available aromatic nuclei substituted by a sulfonate group, by neutralizing the sorbed acidic compound with sufficient aqueous strong base to convert the sorbed acidic compound to the ionic water-soluble salt of said base and said acidic compound and any acid form resin to the salt of said base and said acid form resin and eluting said salt of said acidic compound from said resin salt with water.

2. The method of claim 1 wherein the acidic compound is phenol.

3. The method of claim 1 wherein the acidic compound is phenol and the resin is in the sodium salt form.

4. The method of claim 1 wherein the resin is in the hydrogen form.

5. The method of claim 1 wherein the acidic compound is a carboxylic acid of the group consisting of aliphatic and aromatic monocarboxylic and dicarboxylic acids and their alkyl, aralkyl, amino and halo substitution products and the resin is in the hydrogen form.

6. The method of claim 5 wherein the acidic compound is propionic acid.

7. The method of claim 5 wherein the acidic compound is valeric acid.

8. The method of claim 5 wherein the acidic compound is caprylic acid.

9. The method of claim 5 wherein the acidic compound is adipic acid.

10. The method of claim 5 wherein the acidic compound is benzoic acid.

11. The method of claim 5 wherein the acidic compound is phenylalanine.

12. The method of claim 5 wherein the acidic compound is a carboxylic acid which has an ionization constant not greater than $10^{-4}$ and the resin is in the acid form.

References Cited

UNITED STATES PATENTS 3,179,703   4/1965   Rieman _____ 260—621

ALEX MAZEL, *Primary Examiner.*

R. RUSH, *Assistant Examiner.*